United States Patent
Ali (10) Patent No.: US 7,746,631 B2
(45) Date of Patent: Jun. 29, 2010

(54) METHODS AND APPARATUS FOR COOLING ELECTRONIC DEVICES USING THERMALLY CONDUCTIVE HINGE ASSEMBLIES

(75) Inventor: Ihab A. Ali, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/241,012

(22) Filed: Sep. 29, 2008

(65) Prior Publication Data
US 2010/0053885 A1    Mar. 4, 2010

Related U.S. Application Data

(60) Provisional application No. 61/093,113, filed on Aug. 29, 2008.

(51) Int. Cl.
*H05K 7/20* (2006.01)
*F28D 15/00* (2006.01)

(52) U.S. Cl. .............................. 361/679.47; 165/104.33; 361/679.27; 361/679.52; 361/679.54; 361/700

(58) Field of Classification Search ............ 361/679.47, 361/700
See application file for complete search history.

(56) References Cited

U.S. PATENT DOCUMENTS

| | | | | |
|---|---|---|---|---|
| 5,588,483 | A * | 12/1996 | Ishida ........................ | 165/86 |
| 5,621,613 | A * | 4/1997 | Haley et al. ............. | 361/679.27 |
| 5,718,282 | A * | 2/1998 | Bhatia et al. ................... | 165/86 |
| 5,880,929 | A * | 3/1999 | Bhatia ..................... | 361/679.27 |
| 6,175,493 | B1 * | 1/2001 | Gold ...................... | 361/679.47 |
| 6,189,602 | B1 * | 2/2001 | Tanahashi et al. ............. | 165/86 |
| 6,226,177 | B1 * | 5/2001 | Rude et al. ............. | 361/679.52 |
| 6,507,488 | B1 * | 1/2003 | Cipolla et al. .......... | 361/679.52 |
| 2002/0051339 | A1 * | 5/2002 | Ohashi et al. ............... | 361/687 |
| 2002/0064027 | A1 * | 5/2002 | Sasaki et al. ................ | 361/700 |
| 2003/0011983 | A1 * | 1/2003 | Chu et al. .................... | 361/687 |
| 2004/0080908 | A1 * | 4/2004 | Wang et al. ................. | 361/687 |
| 2007/0070599 | A1 * | 3/2007 | Chang ........................ | 361/687 |

* cited by examiner

*Primary Examiner*—Gregory D Thompson
(74) *Attorney, Agent, or Firm*—Kramer Levin Naftalis & Frankel LLP (57) ABSTRACT

An electronic device can be provided with a first housing at least partially containing a first electronic component, a second housing, and a hinge assembly coupled to the first housing and the second housing. The hinge assembly may be configured to dissipate heat generated by the first electronic component away from the first housing. In some embodiments, the hinge assembly may be configured to dissipate heat generated by the first electronic component away from the first housing and on to the second housing. The second housing may include a heat spreader for dissipating the heat from the hinge assembly throughout the second housing.

24 Claims, 6 Drawing Sheets

FIG. 6D

METHODS AND APPARATUS FOR COOLING ELECTRONIC DEVICES USING THERMALLY CONDUCTIVE HINGE ASSEMBLIES

CROSS-REFERENCE TO RELATED APPLICATION

This claims the benefit of U.S. Provisional Patent Application No. 61/093,113, filed Aug. 29, 2008, which is hereby incorporated by reference herein in its entirety.

FIELD OF THE INVENTION

This can relate to systems and methods for cooling an electronic device, and, more particularly, to systems and methods for cooling an electronic device using a thermally conductive hinge assembly.

BACKGROUND OF THE DISCLOSURE

As electronic components of various electronic devices (e.g., laptop computers) evolve into faster and more dynamic machines, their power requirements often consequently increase. With this increase in power consumption, an increase in power dissipation in the form of heat results. For example, in a laptop computer, chipsets and microprocessors, such as central processing units ("CPUs") and graphics processing units ("GPUs"), are major sources of heat. Heat dissipation is an important consideration in the design of such electronic devices. If this heat is not adequately dissipated, the electronic components may fail and/or cause damage to the electronic device.

Accordingly, what is needed are systems and methods for cooling an electronic device.

SUMMARY OF THE DISCLOSURE

Systems and methods for cooling an electronic device are provided.

According to one embodiment of the invention, there is provided an electronic device that may include a first housing and a second housing. The first housing may include a first electronic component. The electronic device may also include a hinge assembly coupled to the first housing and the second housing. The hinge assembly may be configured to dissipate heat generated by the first electronic component away from the first housing. The hinge assembly may also be configured to pass at least a portion of the heat from the first housing to the second housing.

According to another embodiment of the invention, there is provided an electronic device that may include a first housing, a second housing, and a hinge assembly. The hinge assembly may thermally couple the first housing to the second housing.

According to yet another embodiment of the invention, there is provided a method for cooling an electronic device. The electronic device may include a first housing and a second housing coupled by a hinge assembly. The method may include transferring heat from the first housing to the hinge assembly. The method may also include dissipating at least a portion of the heat from the hinge assembly into the second housing.

BRIEF DESCRIPTION OF THE DRAWINGS

The above and other features of the invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Systems and methods for cooling an electronic device using a thermally conductive hinge assembly are provided and described with reference to FIGS. 1-6D.

Figure 1:
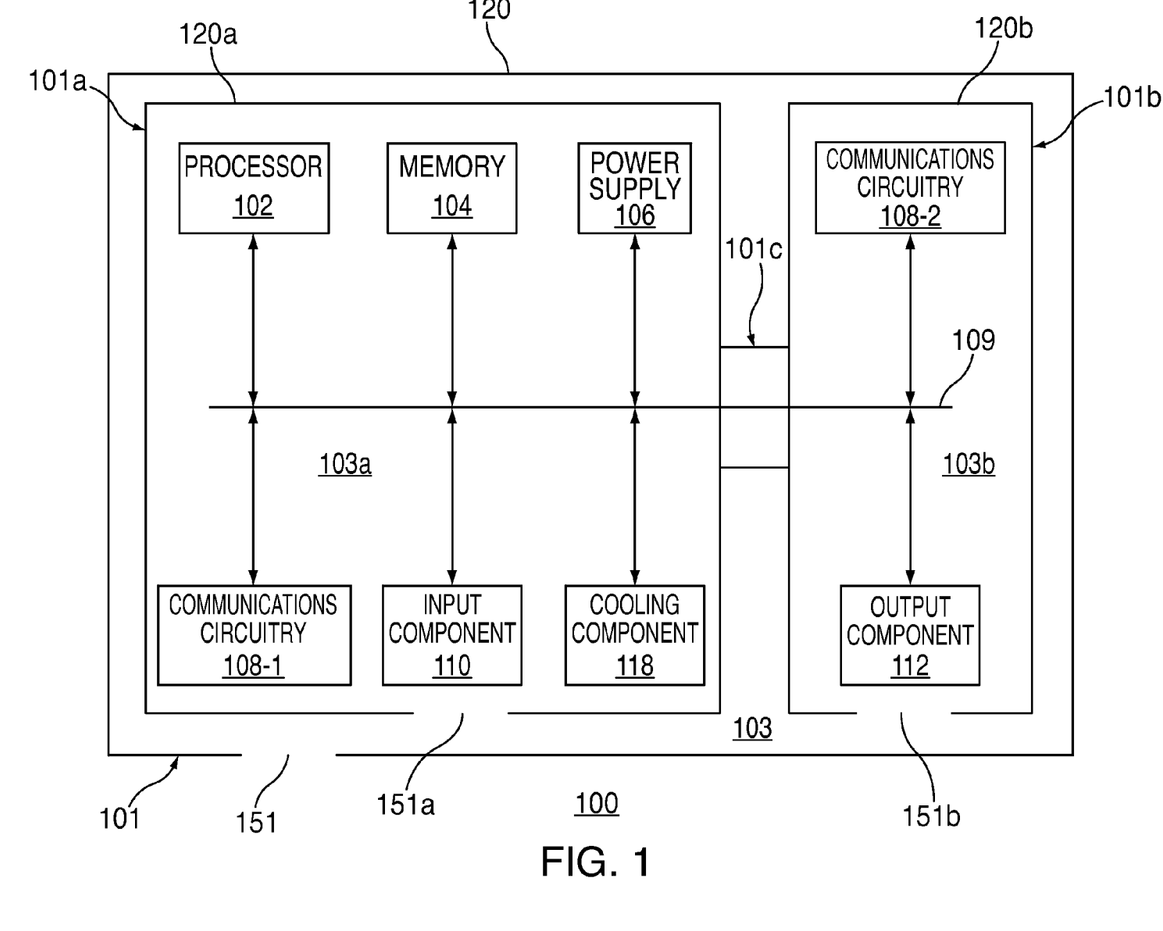
FIG. 1 shows a simplified schematic diagram of an electronic device, according to some embodiments of the invention.

FIG. 1 is a simplified schematic diagram of an electronic device 100 in accordance with some embodiments of the invention. The term "electronic device" can include, but is not limited to, music players, video players, still image players, game players, other media players, music recorders, video recorders, cameras, other media recorders, radios, medical equipment, domestic appliances, transportation vehicle instruments, musical instruments, calculators, cellular telephones, other wireless communication devices, personal digital assistants, remote controls, pagers, computers (e.g., laptops, servers, etc.), monitors, televisions, stereo equipment, set up boxes, set-top boxes, boom boxes, modems, routers, keyboards, mice, speakers, printers, and combinations thereof.

As shown in FIG. 1, electronic device 100 may include housing 101, processor 102, memory 104, power supply 106, communications circuitry 108-1, bus 109, input component 110, output component 112, and cooling component 118. Bus 109 may include one or more wired or wireless links that provide paths for transmitting data and/or power, to, from, or between various components of electronic device 100 including, for example, processor 102, memory 104, power supply 106, communications circuitry 108-1, input component 110, output component 112, and cooling component 118.

Memory 104 may include one or more storage mediums, including, but not limited to, a hard-drive, flash memory, permanent memory such as read-only memory ("ROM"), semi-permanent memory such as random access memory ("RAM"), any other suitable type of storage component, and any combinations thereof. Memory 104 may include cache memory, which may be one or more different types of memory used for temporarily storing data for electronic device applications.

Power supply 106 may provide power to the electronic components of electronic device 100. In some embodiments, power supply 106 can be coupled to a power grid (e.g., when device 100 is not a portable device, such as a desktop computer). In some embodiments, power supply 106 can include one or more batteries for providing power (e.g., when device 100 is a portable device, such as a cellular telephone or a laptop computer). As another example, power supply 106 can be configured to generate power from a natural source (e.g., solar power using solar cells).

Communications circuitry 108-1 may be provided to allow device 100 to communicate with one or more other electronic devices using any suitable communications protocol. For example, communications circuitry 108 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, and any combinations thereof. Communications circuitry 108-1 can also include circuitry that enables device 100 to be electrically coupled to another device (e.g., a computer or an accessory device) and communicate with that other device.

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, microphone, camera, video recorder, and any combinations thereof. Each input component 110 may be configured to provide one or more dedicated control functions for making selections or issuing commands associated with operating device 100.

One or more output components 112 can be provided to present information (e.g., textual, graphical, audible, and/or tactile information) to a user of device 100. Output component 112 can take a variety of forms, including, but not limited to, audio speakers, headphones, signal line-outs, visual displays, antennas, infrared ports, rumblers, vibrators, and any combinations thereof.

It should be noted that one or more input components 110 and/or one or more output components 112 may sometimes be referred to individually or collectively herein as an input/output ("I/O") component or I/O or user interface. It should also be noted that one or more input components 110 and one or more output components 112 may sometimes be combined to provide a single I/O component or user interface, such as a touch screen that may receive input information through a user's touch of a display screen and that may also provide visual information to a user via that same display screen.

One or more cooling components 118 can be provided to help dissipate heat generated by the various electronic components of electronic device 100. Cooling components 118 may take various forms, including, but not limited to, fans, heat sinks, heat spreaders, heat pipes, vents or openings in housing 101 of electronic device 100, and any combinations thereof.

Processor 102 of device 100 may control the operation of many functions and other circuitry provided by device 100. For example, processor 102 can receive input signals from input component 110 and/or drive output signals through output component 112. Processor 102 may load a user interface program (e.g., a program stored in memory 104 or on another device or server) to determine how instructions received via input component 110 may manipulate the way in which information (e.g., information stored in memory 104 or on another device or server) is provided to the user via output component 112.

Housing 101 may at least partially enclose one or more of the various electronic components associated with operating electronic device 100 for protecting them from debris and other degrading forces external to device 100. In some embodiments, housing 101 may include one or more walls 120 that define a cavity 103 within which one or more of the various electronic components of device 100 can be disposed. In some embodiments, housing 101 can support various electronic components of device 100, such as I/O component 110 and/or I/O component 112, at the surfaces or within one or more housing openings 151 through the surfaces of walls 120 of housing 101. Housing openings 151 may also allow certain fluids (e.g., air) to be drawn into and discharged from cavity 103 of electronic device 100 for helping to manage the internal temperature of device 100. Housing 101 can be formed from a wide variety of materials including, but not limited to, metals (e.g., steel, copper, titanium, aluminum, and various metal alloys), ceramics, plastics, and any combinations thereof. Housing 101 may also help to define the shape or form of electronic device 100. That is, the contour of housing 101 may embody the outward physical appearance of electronic device 100.

In some embodiments, rather than being provided as a single enclosure, housing 101 may be provided as two or more housing components, and one or more of the electronic components of electronic device 100 may be provided within its own housing component (e.g., input component 110 may be an independent keyboard or mouse within its own housing component that may wirelessly or through a wire communicate with processor 102, which may similarly be provided within its own housing component). As shown in FIG. 1, processor 102, memory 104, power supply 106, communications circuitry 108-1, input component 110, and cooling component 118 may be at least partially contained within a first housing component 101a, while output component 112 may be at least partially contained within a second housing component 101b.

Each one of housing components 101a and 101b may include one or more walls 120 that define a cavity 103 within which one or more of the various electronic components of device 100 can be disposed. In some embodiments, housing component 101a can support various electronic components of device 100, such as input component 110, at the surfaces or within one or more housing openings 151a through the surfaces of walls 120a defining cavity 103a of housing component 101a. Similarly, in some embodiments, housing component 101b can support various electronic components of device 100, such as output component 112, at the surfaces or within one or more housing openings 151b through the surfaces of walls 120b defining cavity 103b of housing component 101b.

Each one of first housing component 101a and second housing component 101b may be coupled to a single housing component connector assembly 101c. Housing component connector assembly 101c can be configured in any suitable way to maintain each of housing components 101a and 101b in one or more various positions with respect to the other housing component. Housing connector assembly 101c may take various forms, including, but not limited to, a hinge or clutch assembly that can allow one housing component to pivot about a hinge axis relative to the other housing component, and any combinations thereof.

Housing connector assembly 101c may also provide a path for bus 109 to extend through connector assembly 101c and between first housing component 101a and second housing component 101b for transmitting data and/or power, to, from, or between various components of the two housing components. Additionally or alternatively, in some embodiments, housing component 101a may include first communications circuitry 108-1 and second housing component 101b may include second communications circuitry 108-2, and each housing component may also include its own bus (not shown). Therefore, in such embodiments, the communications circuitry of each housing component 101a and 101b can communicate information with each other, and a bus of each housing component 101a and 101b can transmit that information to, from, or between the various components of that housing component.

Each one of housing components 101a-101c can be formed from a wide variety of materials including, but not limited to, metals (e.g., steel, copper, titanium, aluminum, and various metal alloys), ceramics, plastics, and any combinations thereof. Each one of housing components 101a-101c of housing 101 may also help to define the shape or form of electronic device 100. That is, the contour of each one of housing components 101a-101c of housing 101 may embody the outward physical appearance of at least a portion of electronic device 100.

Electronic components of electronic device 100 may generate heat that can adversely affect the operation of device 100. For example, in a laptop computer, chipsets and microprocessors, such as central processing units ("CPUs") and graphics processing units ("GPUs"), are major sources of heat. Heat dissipation is an important consideration in the design of such electronic devices. If this heat is not adequately dissipated, the electronic components may fail and/or cause damage to the electronic device. Therefore, in some embodiments, first housing component 101a may be thermally coupled to housing connector assembly 101c for conducting, convecting, passing, or otherwise transferring heat generated by one or more electronic components (e.g., processor 102) of first housing component 101a away from first housing component 101a to housing connector assembly 101c. By removing heat from first housing component 101a, housing connector assembly 101c may cool first housing component 101a considerably, thereby potentially increasing the amount of power that the electronic components of first housing component 101a may sustain. This may also obviate the need for other thermal cooling techniques or components, such as the need to activate a cooling component 118 configured as a fan, for example.

Moreover, in some embodiments, housing connector assembly 101c may also be thermally coupled to second housing component 101b for conducting, convecting, passing, or otherwise transferring the heat received by housing connector assembly 101c from first housing component 101a to second housing component 101b. Second housing component 101b may include less heat generating electronic components than first housing component 101a, and may therefore be more able to dissipate the heat generated by the electronic components of first housing component 101a. In some embodiments, second housing component 101b may even include components that can benefit from additional heat being transferred from housing connector assembly 101c to second housing component 101b. Therefore, by exploiting the heat dissipation characteristics of housing connector assembly 101c independently or in conjunction with the heat dissipation characteristics of second housing component 101b, the heat generating electronic components of first housing component 101a may be cooled efficiently and effectively.

Figure 2:
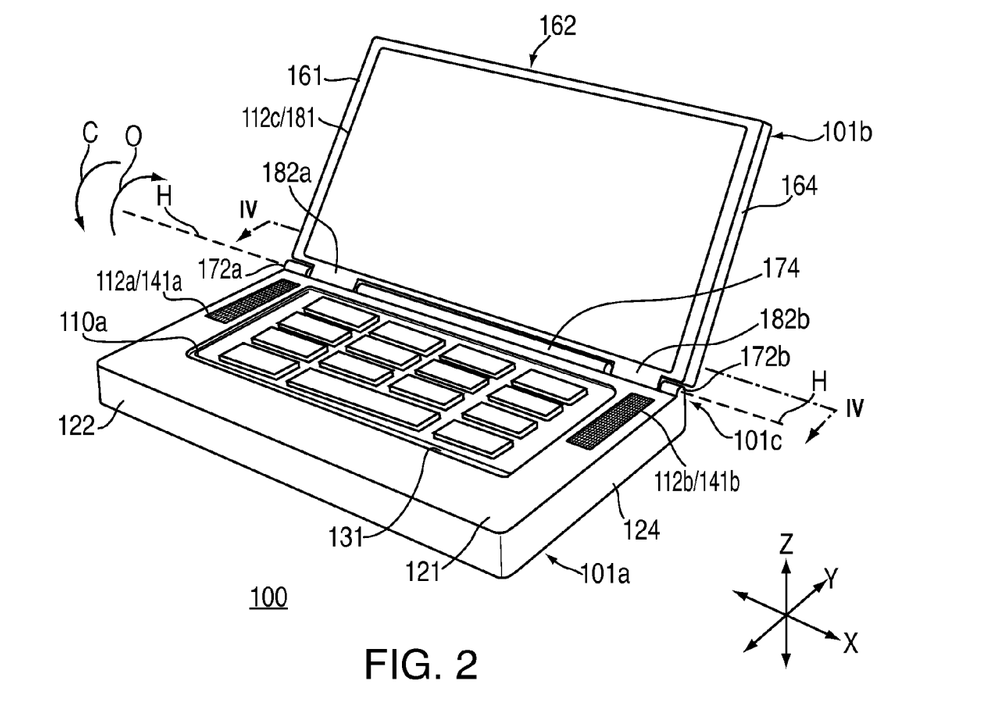
FIG. 2 shows a top, front, right perspective view of the electronic device of FIG. 1 in an open position, according to some embodiments of the invention.
Figure 3:
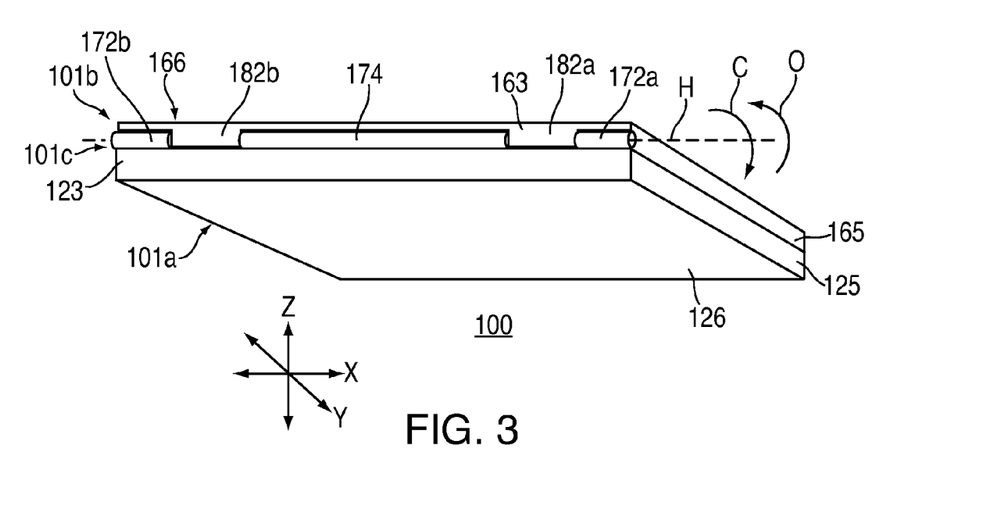
FIG. 3 shows a bottom, back, left perspective view of the electronic device of FIGS. 1 and 2 in a closed position, according to some embodiments of the invention.

Electronic device 100 is illustrated in FIGS. 2-6D to be a laptop computer, although it is to be understood that electronic device 100 may be any type of electronic device as described herein in accordance with the invention. As shown in FIGS. 2 and 3, for example, housing 101 of electronic device 100 may be configured to provide two housing components coupled together by a housing connector assembly. Particularly, housing 101 may include first or "lower" housing component 101a and second or "upper" housing component 101b coupled to one another by housing connector or "hinge" assembly 101c, also known as clutch assembly 101c. Housing components 101a, 101b, and 101c may be configured such that electronic device 100 may be "opened" for use (see, e.g., FIG. 2) by rotating upper housing component 101b away from lower housing component 101a in the direction of arrow O about hinge axis H of hinge assembly 101c, and such that electronic device 100 may be "closed" (see, e.g., FIG. 3) by rotating upper housing component 101b towards lower housing component 101a in the direction of arrow C about hinge axis H. However, it should be noted that housing 101 of device 100 is only exemplary and need not include two substantially hexahedral portions coupled by a hinge. For example, in certain embodiments, the housing of device 100 could generally be formed in any other suitable shape, including, but not limited to, two or more housing components or portions that are substantially spherical, ellipsoidal, conoidal, octahedral, and any combinations thereof, coupled by any other suitable housing connector assembly.

Figure 6A:
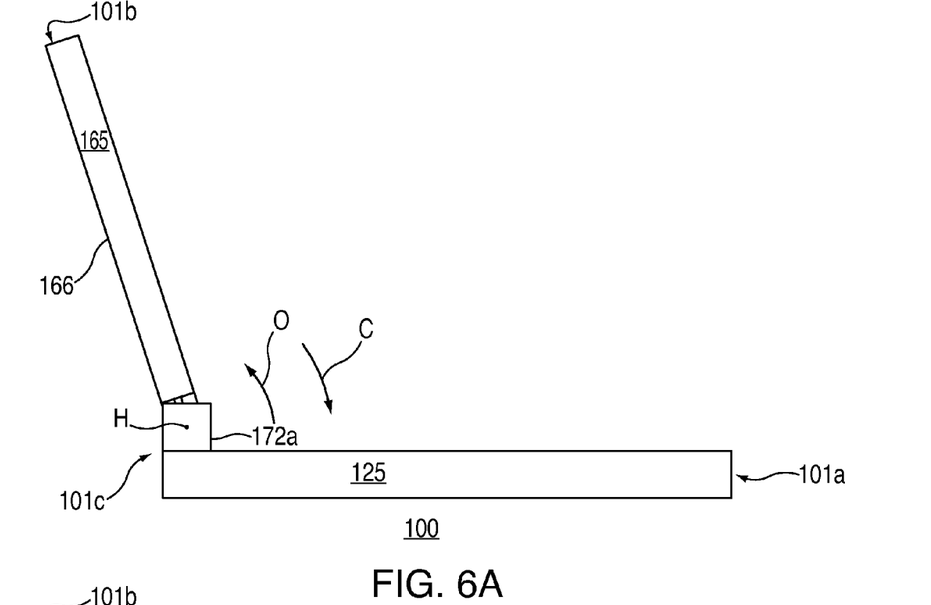
FIG. 6A shows a cross-sectional view of the electronic device of FIGS. 2-4A and 5, including an upper housing component, taken from line VIA-VIA of FIG. 5.
Figure 6B:
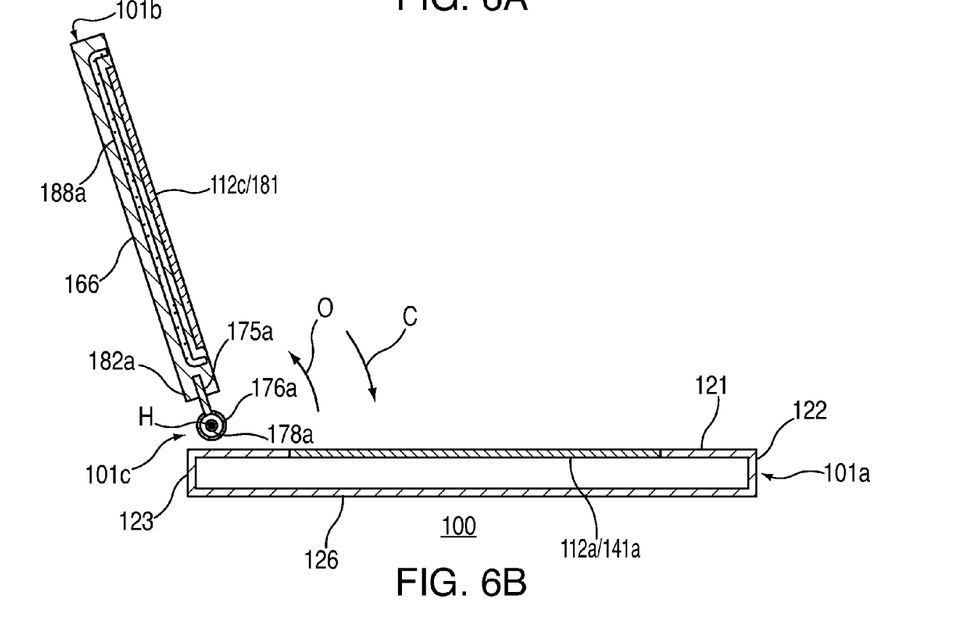
FIG. 6B shows a cross-sectional view of the electronic device of FIGS. 2-4A, 5, and 6A, including an upper housing component, taken from line VIB-VIB of FIG. 5.
Figure 6C:
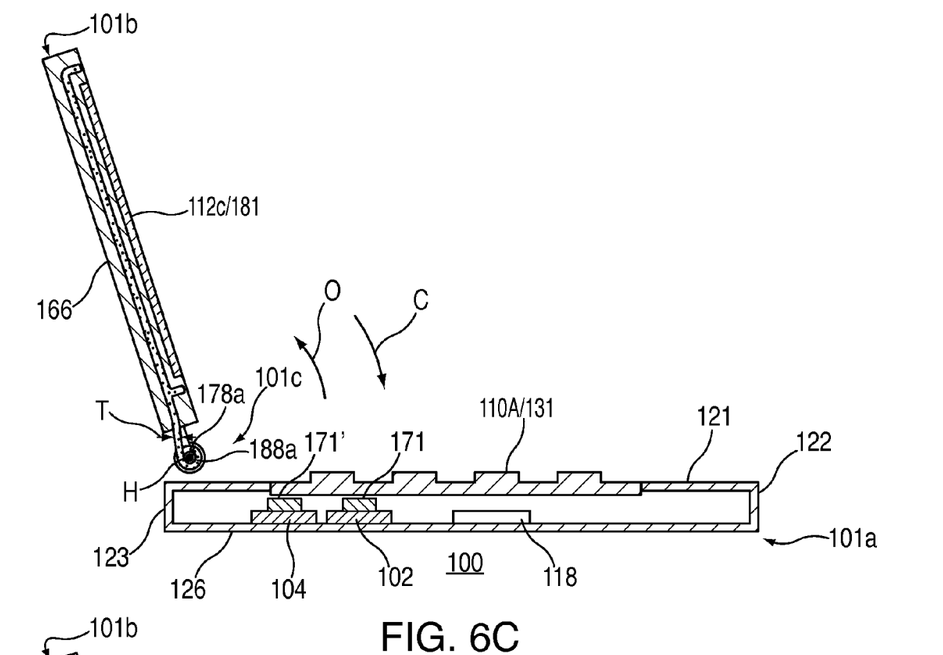
FIG. 6C shows a cross-sectional view of the electronic device of FIGS. 2-4A and 5-6B, including an upper housing component, taken from line VIC-VIC of FIG. 5.
Figure 6D:
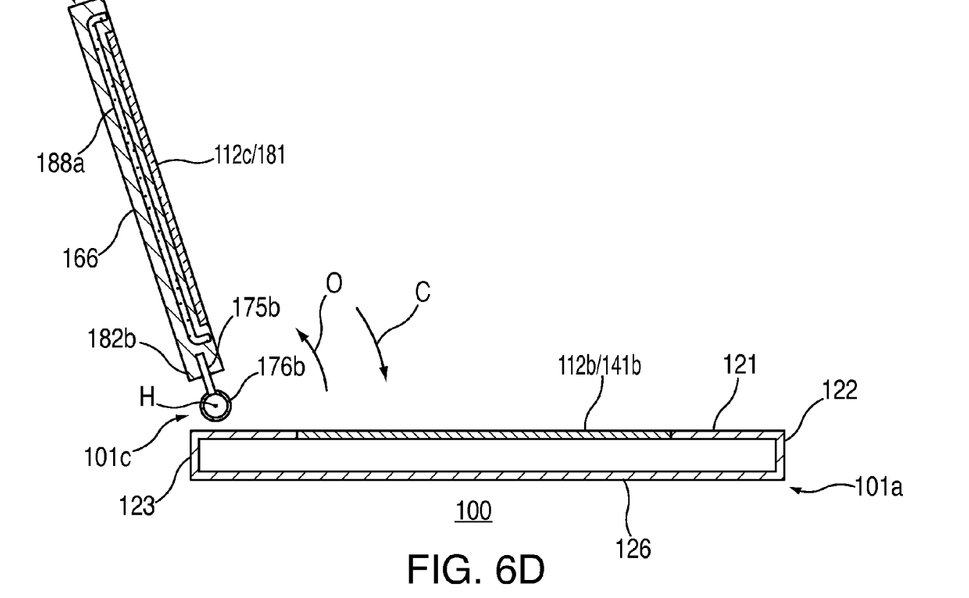
FIG. 6D shows a cross-sectional view of the electronic device of FIGS. 2-4A and 5-6C, including an upper housing component, taken from line VID-VID of FIG. 5.

Lower housing component 101a may include a top wall 121, various side walls, such as front wall 122, back wall 123, right wall 124, and left wall 125, and a bottom wall 126 opposite top wall 121. In some embodiments, one or more openings may be provided through one or more of the walls of lower housing component 101a to at least partially expose one or more components of electronic device 100. For example, as shown in FIGS. 2 and 6C, an opening 131 may be provided through top wall 121 of lower housing component 101a to at least partially expose an input component 110a of electronic device 100. In some embodiments, as shown in FIGS. 2, 6B, and 6D, for example, openings 141a and 141b may be provided through top wall 121 of lower housing component 101a to at least partially expose respective output components 112a and 112b of electronic device 100.

Likewise, upper housing component 101b may include a top wall 161, various side walls, such as front wall 162, back wall 163, right wall 164, and left wall 165, and a bottom wall 166 opposite top wall 161. In some embodiments, one or more openings may be provided through one or more of the walls of upper housing component 101b to at least partially expose one or more components of electronic device 100. For example, as shown in FIGS. 2 and 6B-6D, an opening 181 may be provided through top wall 161 of upper housing component 101b to at least partially expose an output component 112c of electronic device 100.

Input component 110a is illustrated in FIGS. 2 and 6C to be a keyboard assembly, although it is to be understood that input component 110a exposed by opening 131 through top wall 121 of lower housing component 101a may be any type of input component or other electronic component as described herein in accordance with the invention. Moreover, although output components 112a and 112b are illustrated in FIGS. 2, 6B, and 6D to be audio speakers, it is to be understood that each one of output components 112a and 112b exposed by respective openings 141a and 141b through top wall 121 of lower housing component 101a may be any type of output component or other electronic component as described herein in accordance with the invention. Similarly, although output component 112c is illustrated in FIGS. 2 and 6B-6D to be a visual display, it is to be understood that output component 112c exposed by opening 181 through top wall 161 of upper housing component 101b also may be any type of output component or other electronic component as described herein in accordance with the invention.

Hinge assembly 101c may include one or more hinge blocks (e.g., hinge blocks 172a and 172b) coupled to lower housing component 101a and one or more shaft portions 174 coupled to upper housing portion 101b. In some embodiments, upper housing portion 101b may include one or more leg portions (e.g., leg portions 182a and 182b) coupled to one or more shaft portions 174 of hinge assembly 101c. Each shaft portion 174 may be coupled to and may rotate with respect to one or more hinge blocks (e.g., in the directions of arrows C and 0 about hinge axis H). For example, as shown in FIGS. 2-4A and 5-6D, hinge assembly 101c may include a first hinge block 172a and a second hinge block 172b extending from opposite ends of top wall 121 of lower housing component 101a. One or more shaft portions 174 may extend from and between hinge blocks 172a and 172b of hinge assembly 101c for coupling with one or more portions of upper housing component 101b.

Figure 4A:
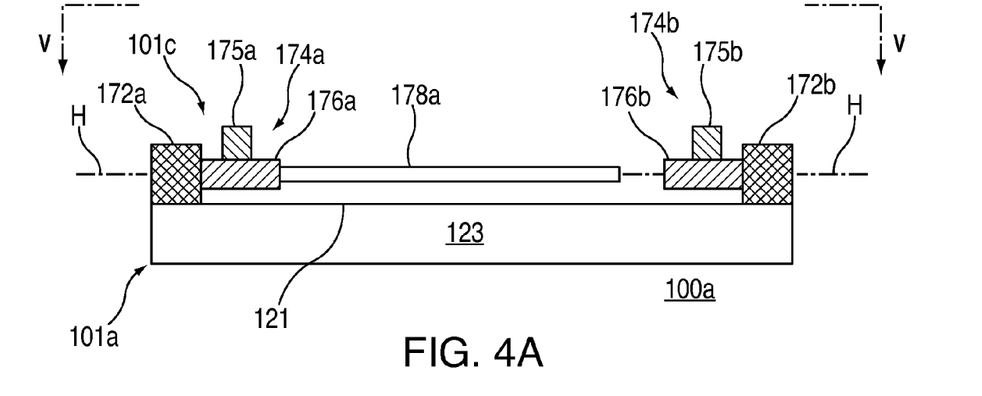
FIG. 4A shows a back elevational view of a lower housing component and hinge assembly of the electronic device of FIGS. 1-3, taken from line IV-IV of FIG. 2, according to some embodiments of the invention.

In some embodiments, as shown in FIG. 4A, electronic device 100a may include a hinge assembly 101c having two independent hinge blocks 172a and 172b extending upwardly away from top wall 121 of lower housing component 101a, and each hinge block may be coupled to its own respective independent shaft portion 174. For example, first hinge block 172a may be coupled to a first shaft portion 174a including a first hinge shaft 176a that may extend away from first hinge block 172a and towards second hinge block 172b along hinge axis H. Similarly, second hinge block 172b may be coupled to a second shaft portion 174b including a second hinge shaft 176b that may extend away from second hinge block 172b and towards first hinge block 172a along hinge axis H.

Figure 4B:
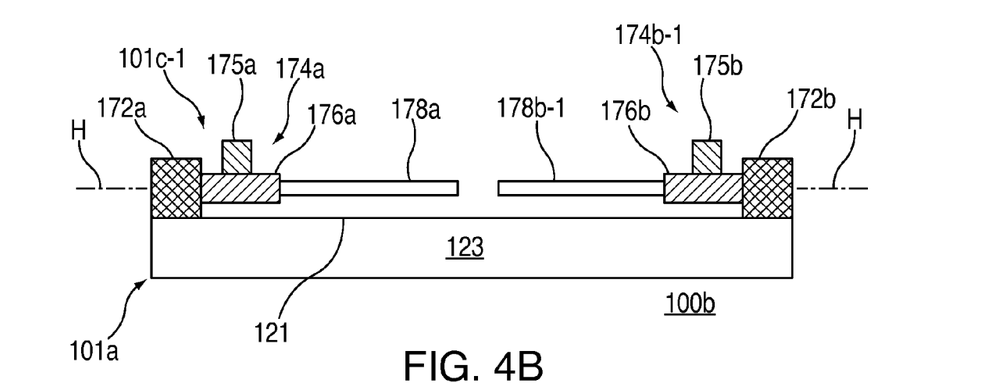
FIG. 4B shows a back elevational view of a lower housing component and hinge assembly of the electronic device of FIGS. 1-3, taken from line IV-IV of FIG. 2, according to some other embodiments of the invention.
Figure 4C:
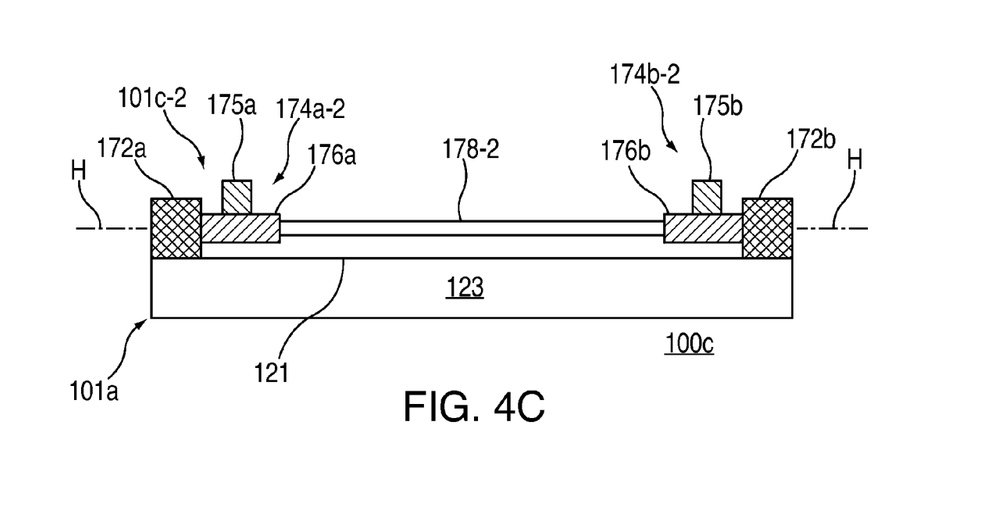
FIG. 4C shows a back elevational view of a lower housing component and hinge assembly of the electronic device of FIGS. 1-3, taken from line IV-IV of FIG. 2, according to yet some other embodiments of the invention.
Figure 5:
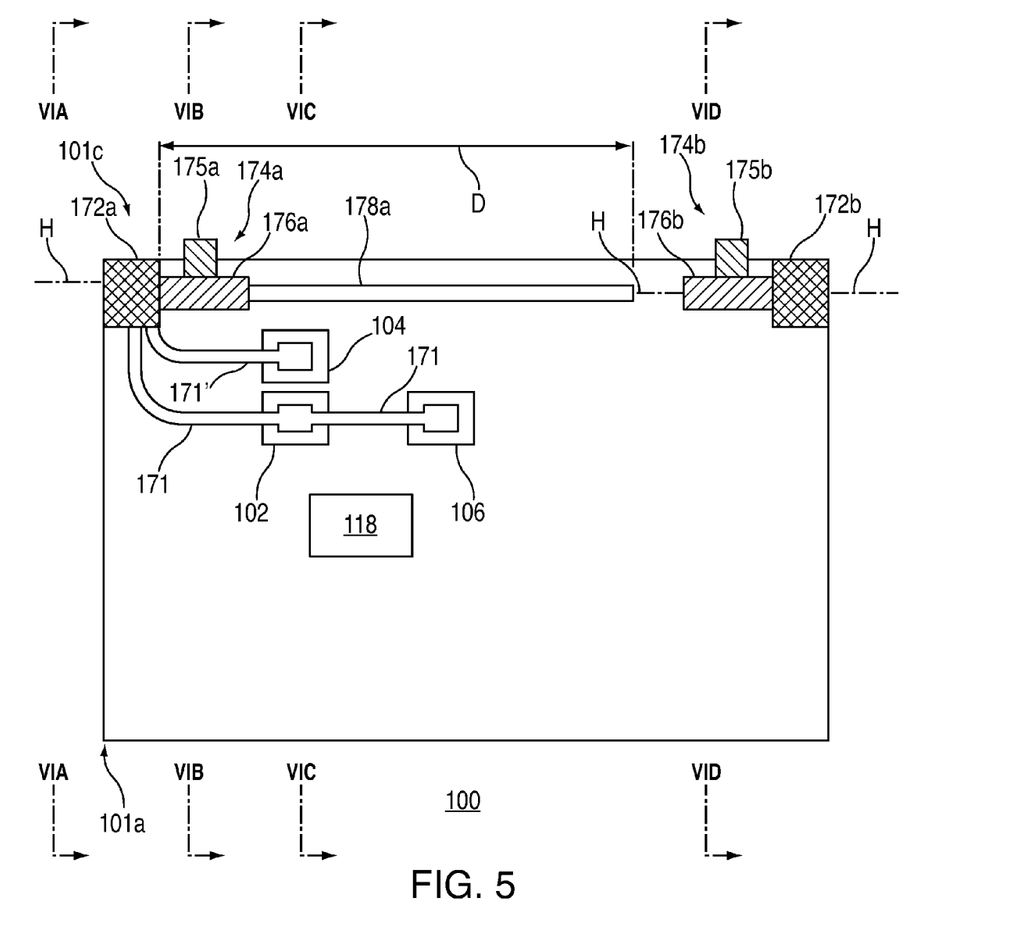
FIG. 5 shows a top elevational view of the lower housing component and hinge assembly of the electronic device of FIGS. 1-4A, taken from line V-V of FIG. 4A, according to some other embodiments of the invention.

Each shaft portion 174 may also include a mounting component coupled to its hinge shaft (see, e.g., mounting components 175a and 175b coupled to respective hinge shafts 176a and 176b of FIGS. 4A-5). Each mounting component may be coupled to a respective leg portion of upper housing component 101b (not shown in FIG. 4A, but see, e.g., leg portions 182a and 182b of respective FIGS. 6B and 6D), for example, by an adhesive or other connecting elements, such as one or more screws. Alternatively, each leg portion of upper housing component 101b may be directly coupled to a respective hinge shaft. Each hinge shaft 176a/176b and its mounting component 175a/175b may rotate about hinge axis H with respect to its hinge block 172a/172b (i.e., in the direction of arrows C and/or 0 of FIGS. 2 and 3). It is to be understood that when a single upper housing component 101b is coupled to both mounting component 175a of first shaft portion 174a and mounting component 175b of second shaft portion 174b, each mounting component 175a/175b may rotate with respect to its hinge block 172a/172b about axis H in tandem with the other mounting component 175a/175b.

Hinge assembly 101c may be configured to dissipate heat generated by or within lower housing component 101a away from lower housing component 101a. For example, lower housing component 101a may be thermally coupled to hinge assembly 101c for conducting, convecting, passing, or otherwise transferring heat generated by one or more electronic components of lower housing component 101a away from lower housing component 101a to hinge assembly 101c. Moreover, in some embodiments, hinge assembly 101c may be configured to transfer heat away from lower housing component 101a and to dissipate the heat from lower housing component 101a into upper housing component 101b. For example, hinge assembly 101c may also be thermally coupled to upper housing component 101b for conducting, convecting, passing, or otherwise transferring the heat received from lower housing component 101a to upper housing component 101b.

One or more heat generating components of lower housing component 101a may be thermally coupled to at least one hinge block of hinge assembly 101c. As shown in FIGS. 5 and 6C, processor 102 of lower housing component 101a may be thermally coupled to first hinge block 172a of hinge assembly 101c by one or more thermal connectors 171. Each thermal connector 171 may be any component or components capable of transferring heat generated by processor 102 from processor 102 to hinge block 172a. For example, each thermal connector 171 may be a heat pipe, and any combinations thereof. In some embodiments, each thermal connector 171 may thermally couple hinge block 172a to two or more heat generating components, such as processor 102 and power supply 106 of lower housing component 101a, for example. Additionally or alternatively, a second thermal connector 171' may be provided to thermally couple hinge block 172a to a heat generating component (e.g., memory 104) that is not thermally coupled to hinge block 172a via thermal connector 171.

By removing heat from first housing component 101a, first hinge block 172a of hinge assembly 101c may cool lower housing component 101a, thereby potentially increasing the amount of power that the electronic components (e.g., processor 102) of lower housing component 101a may sustain, for example. This may also obviate the need for lower housing component 101a to use other thermal cooling techniques or components, such as the need to activate cooling component 118 of lower housing component 101a, for example. First hinge block 172a may be made of any suitable material for accepting heat received from one or more thermal connectors 171, such as aluminum. Depending on the various materials making up hinge block 172a, various amounts of heat provided by thermal connectors 171 may actually be received by hinge block 172a.

First hinge block 172a may also be thermally coupled to one or more components of first shaft portion 174a for passing at least some of the heat received by first hinge block 172a from each thermal connector 171 on to first shaft portion 174a. Depending on the various materials making up hinge block 172a, various amounts of heat available to first hinge block 172a may actually be passed on to first shaft portion 174a by hinge block 172a.

For example, first hinge block 172a may be thermally coupled to first hinge shaft 176a for passing at least some of the heat received by first hinge block 172a from each thermal connector 171 on to first hinge shaft 176a. As shown in FIG. 6B, for example, first hinge shaft 176a may be coupled to foot portion 182a of upper housing component 101b via mounting component 175a. Similarly, as shown in FIG. 6D, for example, second hinge shaft 176b may be coupled to foot portion 182b of upper housing component 101b via mounting component 175b. However, when one or more thermal connectors 171 thermally couple first hinge block 172a to one or more heat generating components of lower housing component 101a (e.g., processor 102), first hinge block 172a may transfer any heat received from thermal connectors 171 on to first hinge shaft 176a. In some embodiments, first hinge shaft 176a and mounting component 175a may be configured to pass the heat received by first thermal block 172a from one or more thermal connectors 171 on to one or more portions of upper housing component 101b (e.g., foot portion 182a).

Upper housing component 101b may include less heat generating electronic components than lower housing component 101a, and may therefore be more able to dissipate the heat generated by the electronic components of lower housing component 101a. In some embodiments, upper housing component 101b may even include components that can benefit from additional heat being transferred from hinge assembly 101c to upper housing component 101b.

In addition to or as an alternative to first hinge block 172a passing heat on to first hinge shaft 176a of first shaft portion 174a (e.g., and then on to foot portion 182a of upper housing component 101b via mounting component 175a), first hinge block 172a may pass heat received from one or more thermal conductors 171 on to a hinge heat pipe of first shaft portion 174a. For example, as shown in FIGS. 4A and 5-6D, shaft portion 174a may also include a first hinge heat pipe 178a extending from first hinge block 172a and towards second hinge block 172b along hinge axis H. First hinge block 172a may be thermally coupled to hinge heat pipe 178a for passing at least some of the heat received by first hinge block 172a from each thermal connector 171 on to hinge heat pipe 178a. First hinge heat pipe 178a may receive some or all of the heat passed from first hinge block 172a to first shaft portion 174a depending, at least partially, on whether first hinge shaft 176a is configured to receive any heat from first hinge block 172a.

In some embodiments, as shown in FIGS. 6B-6D, first hinge heat pipe 178a may extend from first hinge block 172a through a hollow portion of first hinge shaft 176a. While first hinge shaft 176a may only extend away from first hinge block 172a to a distance suitable for providing mounting component 175a for aligning with respective foot portion 182a of upper housing component 101b, first hinge heat pipe 178a may extend away even farther from first hinge block 172a to a distance D (see, e.g., FIG. 5). For example, first hinge heat pipe 178a may extend away from first hinge block 172a along hinge axis H to a distance D that may be at least half way between first hinge block 172a and second hinge block 172b.

One or more portions of upper housing component 101b may be coupled to first hinge heat pipe 178a. For example, as shown in FIGS. 6B-6D, upper housing component 101b may include a heat spreader 188a provided throughout a portion of housing component 101b for coupling to first hinge heat pipe 178a. In some embodiments, heat spreader 188a may wrap at least partially about hinge heat pipe 178a (see, e.g., FIG. 6C). In some embodiments, heat spreader 188a may be coupled to hinge heat pipe 178a in any other suitable way or combination of suitable ways, such as with an adhesive. Hinge heat pipe 178a and heat spreader 188a may rotate about hinge axis H with respect to hinge block 172a (i.e., in the direction of arrows C and/or O of FIGS. 2 and 3). Heat spreader 188a may be thermally coupled to hinge heat pipe 178a and may be at least partially made of any material suitable for receiving and dissipating heat from hinge heat pipe 178a, such as graphite (e.g., pyrolytic graphite, orthogonal graphite, etc.). Heat spreader 188a may have a thickness T (see, e.g., FIG. 6C), which may be about 0.1 millimeters in some embodiments.

Upper housing component 101b may include one or more heat spreaders 188a, and each heat spreader 188a may be of any suitable shape and may be positioned in any suitable way with respect to other components of upper housing portion 101b. For example, as shown in FIGS. 6B-6D, heat spreader 188a may be a sheet of graphite provided within upper housing component 101b across substantially the entire area of upper housing component 101b, such as along the entire area of upper housing component 101b between output component 112c and bottom wall 166 of upper housing component 101b. Output component 112c may be a display output component including one or more light emitting diodes ("LEDs"). By receiving and dissipating heat, heat spreader 188a may increase the temperature internal to upper housing component 101b. The temperature of display output component 112c may therefore increase, which may thereby increase the efficiency of the one or more LEDs of the display (e.g., increase the pixel resolution of the display).

Moreover, when positioned proximally to bottom wall 166 of upper housing component 101b, heat spreader 188a may also transfer heat to bottom wall 166, such that the conductive and convective characteristics of the housing walls may help to dissipate the heat provided by heat spreader 188a. Therefore, by exploiting the heat dissipation characteristics of hinge block 172a, shaft portion 174a (i.e., hinge shaft 176a and/or hinge heat pipe 178a), and heat spreader 188a, which may be provided along substantially the entire area of upper housing component 101b, the heat generating electronic components of lower housing component 101a may be cooled efficiently and effectively.

Although hinge assembly 101c of FIGS. 2-4A and 5-6D has been described to include only one hinge block (i.e., first hinge block 172a) that is coupled to one or more heat generating components of lower housing component 101a, a hinge assembly may include two or more hinge blocks thermally coupled to heat generating electronic components. For example, although not shown, first hinge block 172a and second hinge block 172b may each be coupled to one or more heat generating electronic components of lower housing component 101a. First hinge block 172a and second hinge block 172b may each be coupled to the same heat generating component, or first hinge block 172a and second hinge block 172b may each be coupled to different heat generating components of lower housing component 101a.

Therefore, in some embodiments, second hinge block 172b may be coupled to a shaft portion 174b-1 (see, e.g., hinge assembly 101c-1 of FIG. 4B) that may include a second hinge heat pipe 178b-1 extending from second hinge block 172b along hinge axis H for transferring heat to a heat spreader or other portion of upper housing component 101b (e.g., heat spreader 188a). Moreover, in some embodiments, second hinge block 172b may be coupled to a shaft portion 174b-2 (see, e.g., hinge assembly 101c-2 of FIG. 4C) that may share a single hinge heat pipe 178-2 with shaft portion 174a-2 coupled to first hinge block 172a. Single hinge heat pipe 178-2 may extend between first hinge block 172a and second hinge block 172b along hinge axis H for transferring heat from each of the two hinge blocks 172a and 172b to a heat spreader or other portion of upper housing component 101b (e.g., heat spreader 188a). In other embodiments, single hinge heat pipe 178-2 of FIG. 4C may extend between first hinge block 172a and second hinge block 172b even when one of the two hinge blocks 172a/172b is not coupled to a heat generating component of lower housing component 101a.

While there have been described systems and methods for cooling an electronic device using a thermally conductive hinge assembly, it is to be understood that many changes may be made therein without departing from the spirit and scope of the invention. It is also to be understood that various directional and orientational terms such as "front" and "back" and "rear," "left" and "right," "top" and "bottom," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention. Those skilled in the art will appreciate that the invention can be practiced by other than the described embodiments, which are presented for purposes of illustration rather than of limitation, and the invention is limited only by the claims which follow.

What is claimed is:

1. An electronic device comprising:
   a first housing that includes a first electronic component;
   a second housing;
   a hinge assembly coupled to the first housing and the second housing, wherein the hinge assembly is configured to dissipate heat generated by the first electronic component away from the first housing, wherein the hinge assembly comprises:
      a first hinge block coupled to the first housing; and
      a first hinge shaft coupled to the second housing and the first hinge block; and
   a heat spreader, wherein a first portion of the heat spreader is wrapped at least partially about the first hinge shaft, and wherein a second portion of the heat spreader extends away from the first portion of the heat spreader and into the second housing.

2. The electronic device of claim 1 further comprising a first heat pipe, wherein the first heat pipe is configured to receive the heat from the first electronic component and to pass the heat to the first hinge block, and wherein the first hinge block is configured to receive the heat from the first heat pipe and to pass at least a portion of the heat to the first hinge shaft.

3. The electronic device of claim 1, wherein the first hinge shaft includes a first hinge pipe, wherein the first hinge pipe extends from the first hinge block, and wherein the first hinge pipe is coupled to a first portion of the second housing.

4. The electronic device of claim 3, wherein the first hinge pipe is configured to rotate with respect to the first hinge block.

5. The electronic device of claim 1, wherein the hinge assembly is configured to pass at least a portion of the heat from the first housing to the second housing.

6. The electronic device of claim 1, wherein the first hinge shaft is configured to rotate with respect to the first hinge block.

7. The electronic device of claim 1, wherein the first hinge block is configured to receive the heat from the first electronic component and to pass at least a portion of the heat to the first hinge shaft.

8. The electronic device of claim 1, wherein the first hinge shaft is configured to receive the at least a portion of the heat from the first hinge block and to pass at least some of the at least a portion of the heat to the heat spreader.

9. The electronic device of claim 1, wherein the first housing includes a processor, and wherein the second housing includes a display.

10. The electronic device of claim 1, wherein the second housing includes a display, and wherein the hinge assembly is configured to pass at least a portion of the heat from the first housing to the second housing for increasing the efficiency of the display.

11. The electronic device of claim 10, wherein the display is a light emitting diode display.

12. The electronic device of claim 3, wherein the hinge assembly further comprises:
   a second hinge block coupled to the first housing; and
   a second hinge shaft coupled to the second housing and the second hinge block.

13. The electronic device of claim 12, wherein the first hinge pipe extends from the first hinge block to the second hinge block.

14. The electronic device of claim 13, wherein a first end of the first hinge pipe is coupled to the first hinge block, and wherein a second end of the first hinge pipe is coupled to the second hinge block.

15. The electronic device of claim 1, wherein the second housing includes a display, wherein a portion of the second portion of the heat spreader extends along the display between the display and the second housing, and wherein the portion of the second portion of the heat spreader is configured to pass at least a portion of the heat from the first housing to the second housing for increasing the efficiency of the display.

16. An electronic device comprising:
   a first housing that includes a first electronic component;
   a second housing; and
   a hinge assembly coupled to the first housing and the second housing, wherein the hinge assembly is configured to dissipate heat generated by the first electronic component away from the first housing, and wherein the hinge assembly comprises:
      a first hinge block coupled to the first housing; and
      a first hinge shaft coupled to the second housing and the first hinge block, wherein the first hinge shaft includes a first hinge pipe, wherein the first hinge pipe extends from the first hinge block, wherein the first hinge pipe is coupled to a first portion of the second housing, wherein the first hinge shaft also includes a first heat pipe, wherein the first heat pipe extends from the first hinge block, and wherein the first heat pipe is coupled to a second portion of the second housing.

17. The electronic device of claim 16, wherein the second housing includes a heat spreader coupled to the hinge assembly.

18. The electronic device of claim 17, wherein the hinge assembly is configured to pass at least a portion of the heat from the first housing to the heat spreader.

19. The electronic device of claim 17, wherein the heat spreader is at least partially made of graphite.

20. The electronic device of claim 16, wherein the second housing contains a heat spreader coupled to the first hinge shaft.

21. The electronic device of claim 16, wherein the second portion of the housing is a heat spreader.

22. The electronic device of claim 21, wherein the heat spreader is at least partially made of graphite.

23. The electronic device of claim 16, wherein the first heat pipe extends through the first hinge pipe.

24. The electronic device of claim 23, wherein the first heat pipe is configured to rotate with respect to the first hinge block.

* * * * *